United States Patent [19]
Anshus

[11] 3,875,421
[45] Apr. 1, 1975

[54] BICYCLE LIGHT SYSTEM

[75] Inventor: David S. Anshus, New Port Richey, Fla.

[73] Assignee: Needs, Inc., Tampa, Fla.

[22] Filed: Nov. 9, 1973

[21] Appl. No.: 414,462

Related U.S. Application Data

[63] Continuation-in-part of Ser. No. 359,837, May 14, 1973.

[52] U.S. Cl. .................................. 307/9, 307/66
[51] Int. Cl. .................................. B60l 1/14
[58] Field of Search ............... 320/2; 307/9, 64, 66

[56] References Cited
UNITED STATES PATENTS

| | | | |
|---|---|---|---|
| 2,488,021 | 11/1949 | May | 307/9 |
| 3,249,769 | 5/1966 | Mierendorf | 307/64 X |
| 3,267,288 | 8/1966 | Maiden et al. | 307/64 X |
| 3,329,881 | 7/1967 | Tolmie | 320/2 |
| 3,753,000 | 8/1973 | Newman | 307/9 |

Primary Examiner—James D. Trammell
Attorney, Agent, or Firm—Hall and Myers

[57] ABSTRACT

A lighting system for bicycles having an alternating current generator driven by the bicycle. A rechargeable battery is connected to the generator through a diode to thus charge the battery on one half of the a.c. cycle. There is also a second diode and a single pole double throw switch. In one of its two positions the switch energizes the bicycle light through the second diode on the other half of the a.c. cycle. In its other position said switch places the light across the battery.

2 Claims, 2 Drawing Figures

BICYCLE LIGHT SYSTEM

RELATED APPLICATIONS

This is a continuation-in-part of copending application Ser. No. 359,837, filed May 14, 1973.

This invention relates to lighting systems for wheeled vehicles. More specifically, this invention relates to a lighting system particularly useful on bicycles, which system provides for lighting the bicycle regardless of whether it is stopped or in operation.

With the advent of the ecological movement has come a renewed interest in our society for bicycling. Such a renewed interest has increased the number of bicycles on our streets and highways, to the point where they present a significant safety hazard, particularly during the early evening and night hours.

The need for a safe and reliable bicycle lighting system to in some way mitigate this safety hazard is well known. In fact, several attempts have recently been made to provide such a bicycle lighting system, some with a modicum of success.

Generally speaking, the attempts made at providing safe lighting systems for bicycles have been in the area of either providing a generator operated system or a battery operated system. Obviously, these systems taken singularly have serious drawbacks in that, for example, when only a generator is provided, there is no lighting on the bike when the generator is not actually in operation -- such as when a bicycle rider comes to a sudden stop. On the other hand, in those instances where only a battery is employed, these batteries tend to wear down and thus, toward the end of their life, do not satisfy the illumination requirements needed for good safety.

In view of these drawbacks, several attempts have been made to combine a generator with a battery circuit such that when the vehicle is not in operation the battery may take over and operate the lights, and in the alternative when the vehicle is in operation, the generator will not only provide the necessary power for safety illumination, but will also in some instances, recharge the battery. Unfortunately, most known systems of this type have several drawbacks, primarily in the area of expense, complex mechanism, unreliability and the need to employ D.C. generators and the like.

Contrary to most known systems, one recent device has proved quite successful in overcoming the above described drawbacks. Such a device is disclosed in U.S. Pat. Application Ser. No. 350,574 filed in the name of Ronald A. Griffith on Apr. 12, 1973, and entitled "Safety Lighting System." The entire disclosure of this application, including the prior art references cited therein, is incorporated herein by reference. As set forth in that application, this device includes a unique, relatively inexpensive, noncomplex, and reliable multi-source circuit which combines the economic and other advantages of an A.C. generator with a battery such that when the bicycle is not in operation the battery provides sufficient safety illumination for the lights, but when the bicycle is in operation to a degree sufficient for the generator to provide the necessary power for the lights, the battery circuit is cut off such that the generator provides the necessary lighting for the bike, while it also provides the necessary power to recharge the battery. In general, such a multi-source circuit comprises an A.C. generator mounted to be driven by operation of the wheeled vehicle (e.g. bicycle), a battery, means connected to the generator for rectifying the current produced by the generator, sensing means connected to the rectifier means for determining when the voltage at the rectifier means exceeds a predetermined voltage, the sensing means allowing battery current to flow through the lamp when the voltage at the rectifier means is less than the predetermined voltage and for allowing generator current to flow through the lamp when the voltage of the rectifier means is greater than the predetermined voltage. The sensing means employed in the preferred embodiments of that invention, include a relay coil and a resistor which is the primary component for determining the predetermined value of the voltage that will trip the relay coil thus to effect an operation of either the battery circuit or the A.C. generating circuit.

While such a system represents a unique contribution to the art of wheeled vehicle lighting, and particularly for safety lighting of bicycles, it does have the drawback of employing a relatively expensive relay system in order to sense the predetermined value of the voltage necessary for illuminating the lights via the generator rather than the battery and vice versa.

It is a purpose of this invention not only to fulfill the general need in the art of providing a safe and unique lighting system for wheeled vehicles generally and for bicycles more specifically, but also to present and disclose a unique improvement to the advantageous circuit and concept of the aforementioned copending application in that the use of a relay system as the sensing mechanism is eliminated and replaced by a system generally equally as effective, but of better economy. In this respect, the sensing mechanism of this invention generally takes advantage of the unique biasing action of diodes such as those of the conventional silicon type.

The subject invention comprises an alternating current generator driven by the bicycle, a first diode and a rechargeable battery, all connected in series. Thus, the battery is charged on one half of the a.c. cycle. The bicycle light, two-position switching means and a second diode are connected together as well as to said generator, battery and first diode so that in one position of the switching means the light is energized from the generator through the second diode on the other half of the a.c. cycle, and in the other position of the switching means the light is in parallel with the battery.

IN THE DRAWINGS

DETAILED DESCRIPTION

Figure 1:
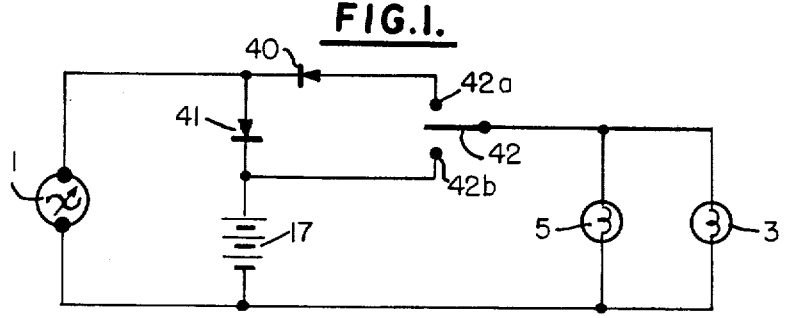
FIG. 1 is a schematic diagram of one preferred circuit in accordance with this invention.

Referring to FIG. 1 there is presented a schematic circuit illustrative of an embodiment for lighting a wheeled vehicle, particularly a bicycle in accordance with this invention. In this schematic, there is provided an A.C. generator 1, a front headlamp 3 and a rear lamp 5. A.C. generator 1 may be of any conventional type and is usually employed on the wheeled vehicle (e.g., bicycle) so as to be activated by motion of a wheel of the vehicle. Front headlamp 3 may be mounted in any conventional and convenient position such as on the front fender or handlebars of a bicycle, while rear lamp 5 may be similarly positioned on the rear of the bike such as below the seat or on the rear fender.

Referring now to FIG. 1, there is illustrated a preferred embodiment of the invention. There is provided, connected in series across the output terminals of A.C. generator 1, a diode 41 whose anode is connected to one terminal of the generator with its cathode connected to the positive side of battery 17, the negative side of battery 17 being connected to the other terminal of the generator. A second diode 40 has its cathode connected to the anode of diode 41 and its anode connected to a switch contact 42a. Switch contact 42b is connected to the cathode of the diode 41. The switch 42 connects the two lamps 3 and 5, through either contact 42a or 42b. The diodes may be lamp 100 PIV silicon diodes.

Switch 42 enables the circuit to be operated in two different modes of operation with differing characteristics. With switch 42 in the upper position, closing contact 42a, battery 17 cannot supply current to the lamps 3 or 5. Furthermore, due to the manner in which diode 41 is poled, the battery 17 is prevented from discharging through A.C. generator 1. The only current source for the lights 3 and 5, with switch 42 closing contact 42a, is the A.C. generator 1. Of course, this will not produce a voltage until the vehicle on which it is mounted is in motion. When the vehicle begins moving generator 1 produces a voltage which increases with increasing velocity. The lights 3 and 5 are illuminated by the negative half-cycles of the output of A.C. generator 1 through diode 40. The positive half-cycles of generator 1, coupled through diode 41, provide a recharging energy for battery 17. Of course, if the vehicle is traveling at relative low speeds, the illumination produced by the lamps 3 and 5 may be inadequate. For this reason operation of the circuit by having switch 42 in position 42a is recommended under either of two conditions: (1) when the vehicle will be operated consistently at a high enough velocity to provide sufficient illumination from lamps 3 and 5; or (2) during the daytime when illumination from lamps 3 and 5 is not required. Under the latter condition, that is operation during the daytime, the A.C. generator 1 provides a relatively fast recharging current, such as about 375 milliamps to battery 17. The actual recharge will of course depend upon the state of charge of battery 17.

With switch 42 in the lower position, closing contact 42b the battery 17 is connected to supply current to the lamps 3 and 5. Thus, lamps 3 and 5 will be illuminated regardless of whether or not the vehicle is in motion, so long as batter 17 can provide sufficient current to energize the lamps. When the vehicle is put in motion the A.C. generator 1 also supplies current to the circuit. The negative half-cycles of current, which is coupled only through diode 40, is unused. However, the positive half-cycles of generator current, coupled through diode 41, can aid in lighting lamps 3 and 5 provided a sufficient velocity is attained for the A.C. generator voltage output to overcome the bias of battery 17 on diode 41. When the vehicle reaches a velocity sufficient to overcome the bias of battery 17 on diode 41, current from the generator flows through the diode 41 and supplies, at least a portion of the illuminating current. As the velocity of the vehicle increases still further, an increasing amount of current to illuminate the lamps 3 and 5 comes from the A.C. generator 1, and a decreasing amount of current is required from battery 17 until a condition is reached where the battery 17 is supplying no current at all. The point at which this condition is reached depends upon the particular A.C. generator employed, the velocity of the vehicle, and the state of charge of battery 17.

Due to the relatively high charging current generated by A.C. generator 1 when switch 42 is in the upper, or 42a position, only rechargeable batteries should be used for the battery 17. However, with the switch 42 in the lower, or 42b position, either chargeable or non-chargeable batteries can be employed.

To describe the circuit in typical operation, the switch 42 would normally be left in the upper or 42a position for daytime riding. In this condition, the battery is recharged by the A.C. generator 1. Initially, for night riding, the switch 42 would be put in the lower or 42b position to enable the battery 17 to supply illuminating current. If, however, fairly consistent relatively high speed travel is forseen the switch 42 can be returned to its upper, or 42a position since the relatively high velocity of the vehicle will maintain sufficient illumination without the necessity of relying upon battery 17.

From the foregoing description those skilled in the art will recognize the manner in which the circuit of FIG. 1 overcomes the difficulties and problems referred to above. In particular, with the switch 42 in the lower or 42b position the lights are safely illuminated regardless of the velocity of the vehicle. As the speed of the vehicle increases more and more of the illuminating current is derived from the A.C. generator and thus the battery 17 discharges at a slower rate. Furthermore, if operation of the vehicle is contemplated as to not require the battery 17 the switch can be positioned in its upper, or 42a position, so that the battery 17 does not discharge at all, and is recharged by the A.C. generator 1.

Figure 2:
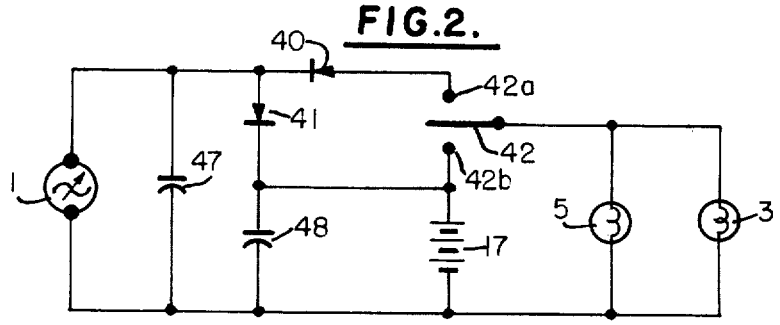
FIG. 2 is a schematic diagram of another preferred circuit in accordance with this invention.

A further modification of the circuit of FIG. 1 is illustrated in FIG. 2, wherein like reference characters identify identical apparatus. The only difference between FIG. 1 and FIG. 2 is the addition of capacitors 47 and 48. Capacitor 47 is connected in parallel with A.C. generator 1 and capacitor 48 is connected in parallel with battery 17. In this circuit capacitor 48 may be a 500 mf 15-25 volt D.C. electrolytic capacitor and capacitor 47 may be a 1 pf disc ceramic capacitor. Either or both of these capacitors are optional, and one may be used in the absence of the other. Capacitor 48 provides filtering action similar to capacitor 23 of FIG. 2. Capacitor 47 is provided for protection against high-frequency transients which could damage the diodes by exceeding their peak inverse voltage limits. Such transients are due to a variety of sources including worn commutator brushes, a shunted section in the generator or even electrostatic generation from the spinning rubber tires of the vehicle. In any event, capacitor 47 presents a low impedance to such high frequency transients in order to protect the circuit diodes. Alternatively, other forms of transient protection can be used such as ceramic-metallic voltage variable resistors. A further alternative is the use of zener diodes in series with the conventional diodes 40 and 41. Aside from the filtering action of capacitor 48 and the transient protection provided by capacitor 47 the circuit of FIG. 2 operates in much the same fashion as does the circuit of FIG. 1. Therefore, no further discussion of the construction or operation of this circuit is necessary at this point.

Once given the above disclosure various other modifications, features and improvements will become apparent to the skilled artisan. Therefore, such modifications, features, and improvements are considered to be a part of this invention, the scope of which is to be determined by the following claims:

I claim:

1. A bicycle lighting system comprising, in combination:

an alternating current generator adapted to be driven at variable speed by the bicycle, an electrical light adapted to be mounted on the bicycle, a rechargeable battery, an electrical connection from one side of the generator to one side of the battery and to one side of the electric light, a first diode, a first side of which is an anode and a second side of which is a cathode, one side of said diode being connected to the other side of said alternating current generator and the other side of said diode being connected to the other side of said rechargeable battery, whereby the battery is charged on one half of the cycle of said alternating current generator when the voltage of the alternating current generator exceeds the voltage of the rechargeable battery, a second diode, a first side of which is an anode and a second side of which is a cathode, one side of said second diode being connected to said one side of said first diode, said last-named connection being between an anode of one of the diodes and a cathode of the other, and switching means connected to the other side of said electric light, to the said other side of said first diode, and to the other side of said second diode for selecting between two circuits, one of which places the electric light, the generator and the second diode in series to thus energize said electric light during the other half cycle of said alternating current generator, and the other of which circuits places the rechargeable battery and the electric light in parallel.

2. A bicycle lighting system as defined in claim 1 in which said switching means comprises a single pole double throw switch comprising an output line connecting said single pole to said other side of said electric light, the switch having two inputs either of which may be selectively connected to said single pole, one of said inputs being connected to said other side of said second diode and the other of said inputs being connected to said other side of said rechargeable battery, whereby when the single pole is connected to said one input of said switch the battery is charged only during one half of the alternating current cycle and the light is energized only during the other half of said alternating current cycle.

* * * * *